US009485104B2

(12) United States Patent
Takada et al.

(10) Patent No.: US 9,485,104 B2
(45) Date of Patent: Nov. 1, 2016

(54) INFORMATION PROCESSING SYSTEM

(75) Inventors: Masashi Takada, Tokyo (JP); Yasuyuki Kudo, Tokyo (JP); Takeshi Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 14/383,829

(22) PCT Filed: Mar. 9, 2012

(86) PCT No.: PCT/JP2012/001621
§ 371 (c)(1),
(2), (4) Date: Sep. 8, 2014

(87) PCT Pub. No.: WO2013/132540
PCT Pub. Date: Sep. 12, 2013

(65) Prior Publication Data
US 2015/0117456 A1  Apr. 30, 2015

(51) Int. Cl.
H04L 12/12 (2006.01)
H04W 52/02 (2009.01)
H04L 12/741 (2013.01)

(52) U.S. Cl.
CPC .............. H04L 12/12 (2013.01); H04L 45/74 (2013.01); H04W 52/0219 (2013.01); Y02B 60/50 (2013.01)

(58) Field of Classification Search
None
See application file for complete search history.

(56) References Cited

U.S. PATENT DOCUMENTS

| 7,650,135 | B2* | 1/2010 | Twitchell | H04W 36/14 455/343.3 |
| 8,335,867 | B1* | 12/2012 | Bar-Shalom | G06F 13/385 710/5 |
| 8,644,204 | B2* | 2/2014 | Tao | H04W 52/02 370/311 |
| 9,014,244 | B2* | 4/2015 | Clausen | H04L 5/0042 375/222 |
| 2003/0033394 | A1* | 2/2003 | Stine | H04L 12/5695 709/222 |
| 2011/0128898 | A1* | 6/2011 | Park | H04W 72/1263 370/311 |

FOREIGN PATENT DOCUMENTS

JP  2010-252165 A  11/2010

OTHER PUBLICATIONS

PCT International Search Report on application PCT/JP2012/001621 mailed May 29, 2012; 2 pages.

* cited by examiner

Primary Examiner — Min Jung
(74) Attorney, Agent, or Firm — Foley & Lardner LLP

(57) ABSTRACT

An information processing system according to the present invention includes a plurality of information processing apparatuses connected by a multihop network, and each of the information processing apparatuses includes a first communication unit configured to transmit and receive a first packet including information about a destination address and a second communication unit configured to communicate at a frequency higher than that of the first communication unit and transmit and receive a second packet including a payload, and in each of the information processing apparatuses, when the first communication unit receives the first packet, the second communication unit is woken up, so that efficient data transfer can be achieved while the power consumption is saved.

9 Claims, 11 Drawing Sheets

■ LOW POWER STATE

FIG. 11

| PORT NUMBER OF TRANSMISSION PORT 145 | PORT NUMBER OF RECEPTION PORT 147 | PORT NUMBER OF TRANSMISSION PORT 125 | PORT NUMBER OF RECEPTION PORT 127 | CONNECTION DESTINATION PROCESSING NODE |
|---|---|---|---|---|
| 0 | 0 | 0 | 0 | [3,6,6] |
| 1 | 1 | 1 | 1 | [4,6,5] |
| 2 | 2 | 2 | 2 | [3,7,5] |
| 3 | 3 | 3 | 3 | [2,6,5] |
| 4 | 4 | 4 | 4 | [3,5,5] |
| 5 | 5 | 5 | 5 | [3,6,4] |

FIG. 12

| NEXT TRANSFER DESTINATION | FINAL DESTINATION |
|---|---|
| [3,6,6] | [3,6,6]、[3,6,7]、··· |
| [4,6,5] | [4,6,5]、[5,6,5]、··· |
| [3,7,5] | [3,7,5]、[3,8,5]、··· |
| [2,6,5] | [2,6,5]、[1,6,5]、··· |
| [3,5,5] | [3,5,5]、[3,4,5]、··· |
| [3,6,4] | [3,6,4]、[3,6,3]、··· |

1200

INFORMATION PROCESSING SYSTEM

TECHNICAL FIELD

The present invention relates to an information processing system, and more particularly, to improvement of data transfer efficiency and power saving in data transfer in a multihop network.

BACKGROUND ART

There is a technique disclosed in PTL 1 which is a power saving technique in data transfer in a multihop network. In the technique disclosed in PTL 1, each terminal receives a wake-up signal addressed to the terminal, and then changes from sleep state to active state to receive data, and analyzes the destination of data included in the received data. When the data are determined to be data addressed to another terminal as a result of analysis, the terminal transmits a wake-up signal to a subsequent terminal.

CITATION LIST

Patent Literature

PTL 1: Japanese Patent Laid-Open No. 2010-252165

SUMMARY OF INVENTION

Technical Problem

In the technique disclosed in PTL 1, the transfer destination is determined by checking the destination address included in the data, and therefore, each terminal has to wait until a data transfer unit is woken up. For this reason, in a case of data transfer in a multihop network, it is necessary to wait for waking up a terminal on each hop, and this reduces the data transfer performance.

Solution to Problem

An information processing system according to the present invention includes a plurality of information processing apparatuses connected by a multihop network, and each of the information processing apparatuses includes a first communication unit configured to transmit and receive a first packet including information about a destination address and a second communication unit configured to communicate at a frequency higher than that of the first communication unit and transmit and receive a second packet including a payload, and in each of the information processing apparatuses, when the first communication unit receives the first packet, the second communication unit is woken up, so that the above problem is solved.

Advantageous Effects of Invention

According the present invention, the power consumed by the second communication unit is reduced, and still, the data transfer performance is not degraded because of waiting for waking up the second communication unit.

BRIEF DESCRIPTION OF DRAWINGS

FIG. 11 is a figure illustrating an example of a correlation table between a communication port and a processing node of a connection destination.

FIG. 12 is a figure illustrating an example of a routing table.

DESCRIPTION OF EMBODIMENTS

[First Embodiment]

Figure 1:
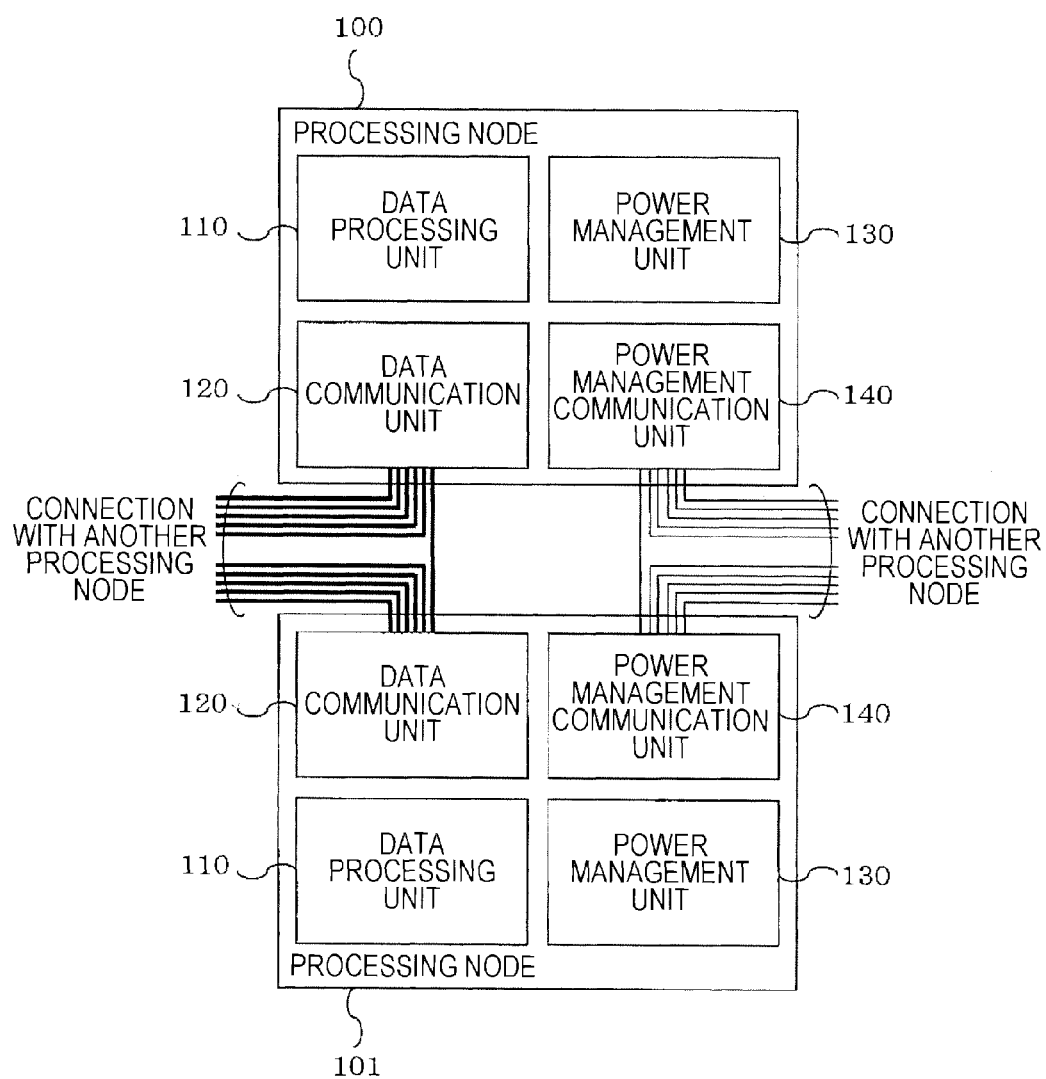
FIG. 1 is a figure illustrating a configuration of processing nodes and connection between processing nodes according to an embodiment of the present invention.

FIG. 1 illustrates a processing node 100 and a processing node 101 which are information processing apparatuses included in an embodiment of an information processing system according to the present invention. FIG. 1 is a block diagram illustrating an internal configuration of a processing node 100 and a processing node 101.

The processing node 100 includes a data processing unit 110 configured to perform various kinds of arithmetic operations and controls, a data communication unit 120 configured to generate a data packet 300 including a payload to be transmitted to another processing node and transmit and receive the data packet 300 to/from another processing node, a power management unit 130 configured to control the power of the data communication unit 120, and a power management communication unit 140 configured to generate a power management packet 400 paired with the data packet 300 and transmit and receive the power management packet 400 to/from another processing node. In the present embodiment, the processing node 101 connected to the processing node 100 and other processing nodes (not shown) are configured to have the same specification as the processing node 100.

Figure 7:
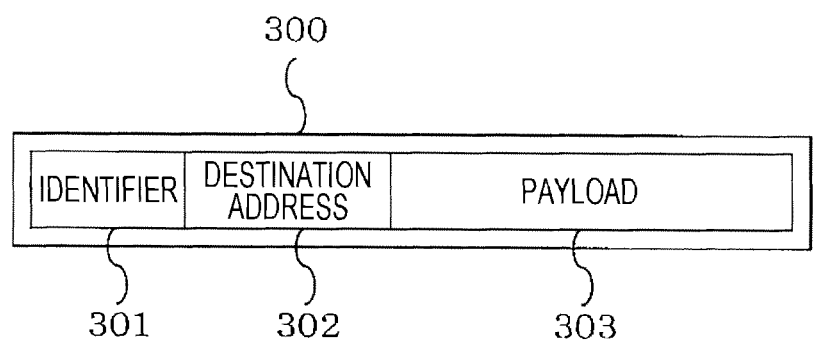
FIG. 7 is a figure illustrating an example of content of a data packet.
Figure 8:
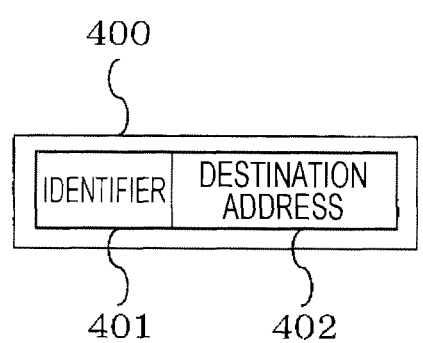
FIG. 8 is a figure illustrating an example of content of a power management packet.

FIG. 7 illustrates a schematic diagram of a configuration content of the data packet 300 according to the present embodiment. The data packet 300 includes, as information, an identifier 301 indicating data transfer contents such as start of a signal and a transfer size, a destination address 302 indicating a processing node of the final transfer destination, and a payload 303 which is actual data. FIG. 8 is a schematic view illustrating configuration contents of the power management packet 400. The power management packet 400 includes, as information, an identifier 401 indicating a power management request content including start of a signal and wake-up of the data communication unit 120 or start of a signal and stop of the data communication unit 120, and a destination address 402 indicating the processing node of the final transfer destination.

As shown in FIG. 1, the data communication unit 120 of the processing node 100 and the data communication unit 120 of the processing node 101 are connected via a channel. The power management communication unit 140 of the processing node 100 and the power management communication unit 140 of the processing node 101 are connected via a channel. Another processing node connected to the processing node 100 is also connected in the same manner as the processing node 101. In the present embodiment, communication between the data communication units 120 of the processing nodes is performed with high speed serial communication in order to exchange data at a high speed. The data communication unit 120 can communicate at a frequency in GHz band, for example. In contrast, the power management packet 400 of which size is smaller than the data packet 300 including the payload 303 is exchanged in communication between the power management communication units 140 of the processing nodes, and therefore, the communication need not be performed at a high speed. Therefore, the communication between the data communication units 140 is slower than the communication between the data communication units 120, and the data communication units 140 communicate with each other at, for example, a frequency in MHz band. Therefore, when the data communication unit 120 is woken up, the data communication unit 120 consumes higher power than the power management communication unit 140 because of the difference in the frequency of the clock used for transmitting and receiving packets. Because of the relationship of this consumed power, the power consumed by the information processing system can be reduced by stopping or hibernating the operation of the portion related to the high speed communication of the data communication unit 120 by stopping the supply of the clock, for example. Further, before the transfer of the data packet 300, the data communication unit 120 required for transfer of the data packet 300 can be woken up by using connection between the power management communication units 140.

Figure 2:
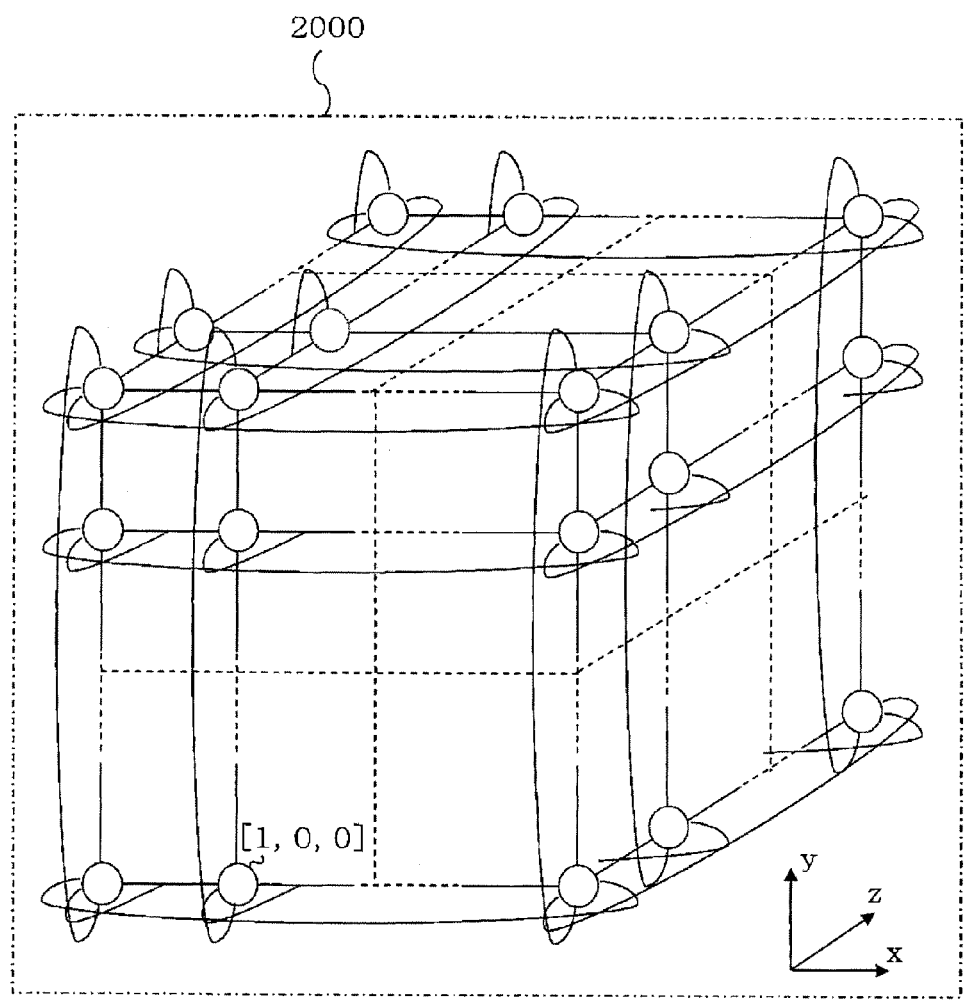
FIG. 2 is a figure illustrating an example of a multihop network according to the present invention.

FIG. 2 illustrates an information processing system 2000 according to the present embodiment. The information processing system 2000 has a multihop network configuration in which multiple information processing apparatuses are connected with each other. In the drawing, a circle denotes a processing node, and a line denotes a connection between processing nodes. The information processing system 2000 is a three-dimensional torus network. Each processing node is given an address of the processing node which is represented by [x, y, z] (x, y, z=0, 1, 2 . . . ). FIG. 2 illustrates, for example, a position of the processing node [1, 0, 0]. The information processing system 2000 is a three-dimensional torus network, but the present invention is not limited to this configuration. The present invention can also be applied to various kinds of multihop networks such as a mesh and a ring.

Figure 3:
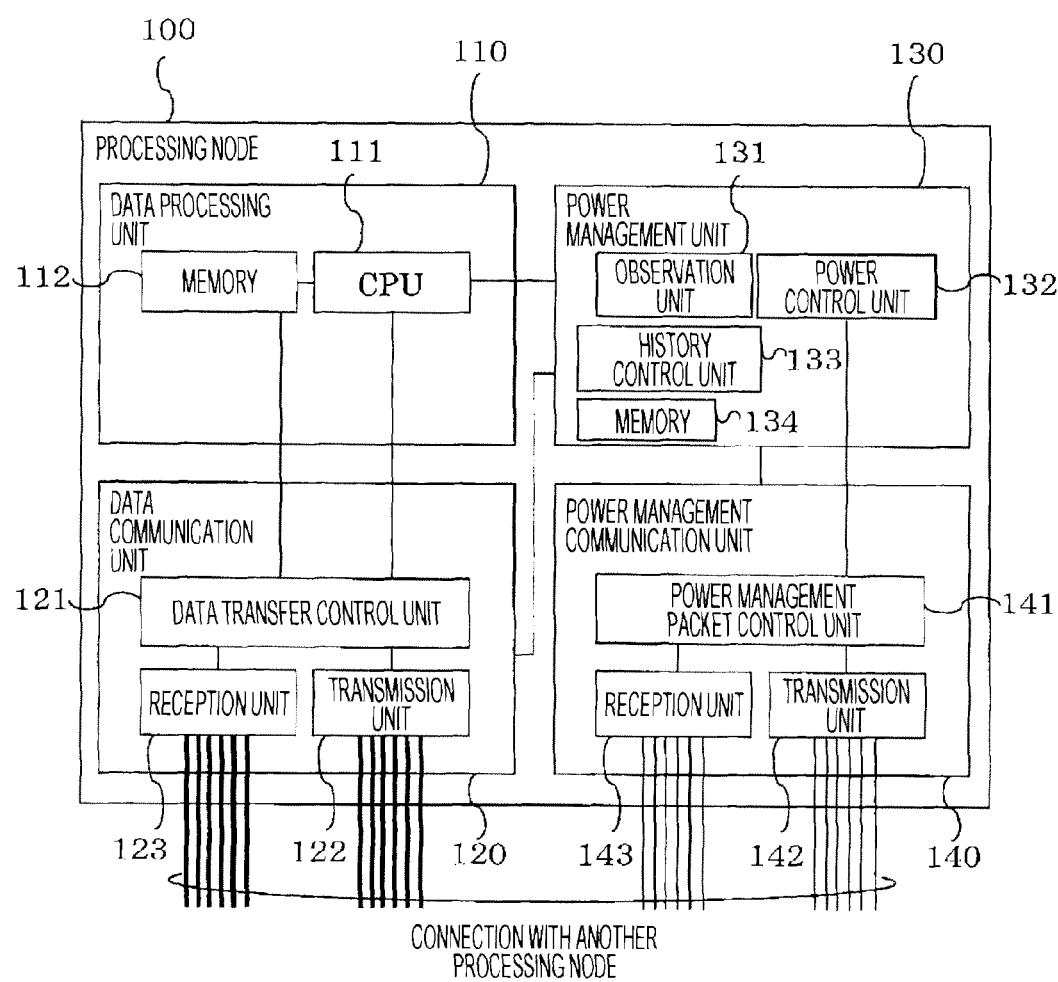
FIG. 3 is a figure illustrating details of a processing node according to the embodiment of the present invention.

FIG. 3 illustrates a block diagram showing the details of the internal configuration of the processing node 100. The data processing unit 110 includes a central processing unit (CPU) 111 and a memory 112. The CPU 111 performs various kinds of arithmetic operations and controls the processing node 100. The memory 112 is used as a storage for storing an intermediate result and a final result of the arithmetic operation processing performed by the CPU 111, and is used as a storage for storing the transmission/reception data.

The data communication unit 120 includes a data transfer control unit 121, a data transmission unit 122, and a data reception unit 123. In accordance with a command given by the data communication power control unit 132, the data communication unit 120 has a function of changing all or apart thereof into a power state, and more specifically, the data communication unit 120 has a function of hibernating or stopping all or a part thereof, in order to save power. In this case, the low power state is a state in which the clock and the power supply are stopped and therefore data cannot be transmitted or received but the power consumption is low. The normal state is a state in which data can be transmitted or received but the consumed power is higher than that in the low power state. The transition from the low power state to the normal state is done in the same manner in accordance with the command given by the data communication power control unit 132. In order to change from the low power state to the normal state or from the normal state to the low power state, it takes at least several microseconds to several dozen microseconds to, e.g., recovery, for example, a clock data recovery (CDR) circuit although it depends on the degree of low power consumption, that is, whether it is hibernation or sleep state. The time required for transmission of the state is a time about ten to hundred times longer than the transfer delay between processing nodes.

In the present embodiment, when no data communication is performed, the data communication unit 120 can change all of the data communication unit 120 into the low power state, and when data communication is performed, each of the ports of the transmission port 125 and the reception port 127 which are not used for the data communication can be changed into the low power state. In the present embodiment, the clock supply and the power supply at each port is stopped, so that each port is stopped, and each port is changed into the low power state. The data communication unit 120 has a timer for each port, and when there is no data communication at the port having received the wake-up request for a certain period of time, e.g., one second, since the reception of the latest wake-up request given to each of the ports of the transmission port 125 and the reception port 127, then the data communication unit 120 gives a stop request of a corresponding portion to the data communication power control unit 132. Therefore, the necessary part of the data communication unit 120 can be woken up for a time sufficient for the transfer of the data packet 300, and even though a command for stop is not actively transmitted from the outside, unnecessary power consumption in the data communication unit 120 can be reduced.

Further, when all the ports in the transmission port 125 are in the low power state, the data communication unit 120 transmits a stop request for stopping the transmission unit 122 to the data communication power control unit 132. Likewise, when all the ports in the reception port 127 are in the low power state, the data communication unit 120 transmits a stop request for stopping the reception unit 123 to the data communication power control unit 132. Further, when all the ports in the transmission port 125 and the reception port 127 are in the low power state, the data communication unit 120 transmits the stop request for stopping the entire data communication unit 120 including the data transfer control unit 121 to the data communication power control unit 132.

The data transfer control unit 121 receives a data transfer command from the CPU 111 to generate a data packet 300, and transmits the generated data packet 300 to the data transmission unit 122. The data transfer control unit 121 extracts the destination address 302 included in the data packet 300 received from another processing node by the data reception unit 123, and determines the address by comparing the extracted destination address 302 and the address of the processing node in question stored in the memory 134 of the power management unit 130 explained later. When the destination address 302 is determined to match the address of the processing node in question as a result of the determination, the data transfer control unit 121 reads data from the memory 112 or writes the payload 303 to the memory 112 in accordance with the decoded result of the identifier 301. When the destination address 302 is determined not to match the address of the processing node in question, the data transfer control unit 121 transmits the data packet 300 to the data transmission unit 122.

Figure 4:
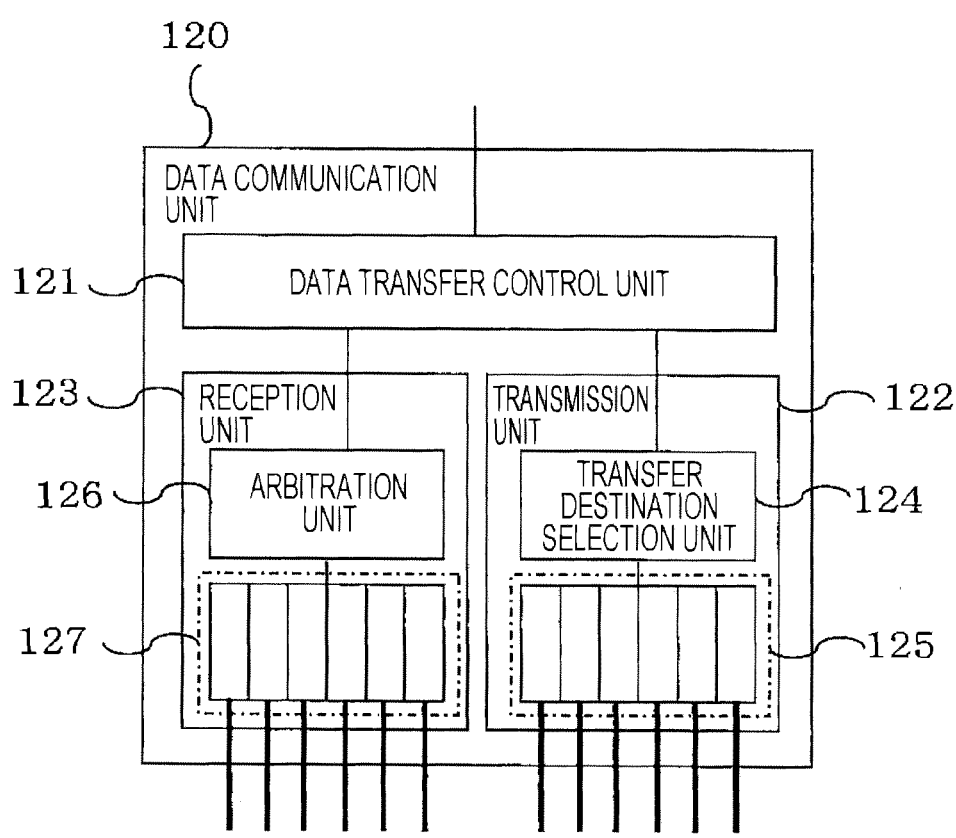
FIG. 4 is a figure illustrating details of an example of a data communication unit.

FIG. 4 illustrates a block diagram of the data communication unit 120, which shows the details of the data transmission unit 122 and the data reception unit 123. The data transmission unit 122 includes a transfer destination selection unit 124 and the transmission port 125 which is the communication port. The transfer destination selection unit 124 makes a selection as to which processing node of the processing nodes connected with the processing node 100 the data packet 300 transmitted from the data transfer control unit 121 is to be transferred to, and transmits the data packet 300 the selected processing node via the transmission port 125. Each port of the transmission port 125 includes a transceiver for a high speed serial transmission capable of communicating at a frequency in GHz band. Therefore, the power consumed by each port of the transmission port 125 is high because the supplied clock is high. Each port of the transmission port 125 is connected with the reception port 127 of another processing node connected.

Figure 5:
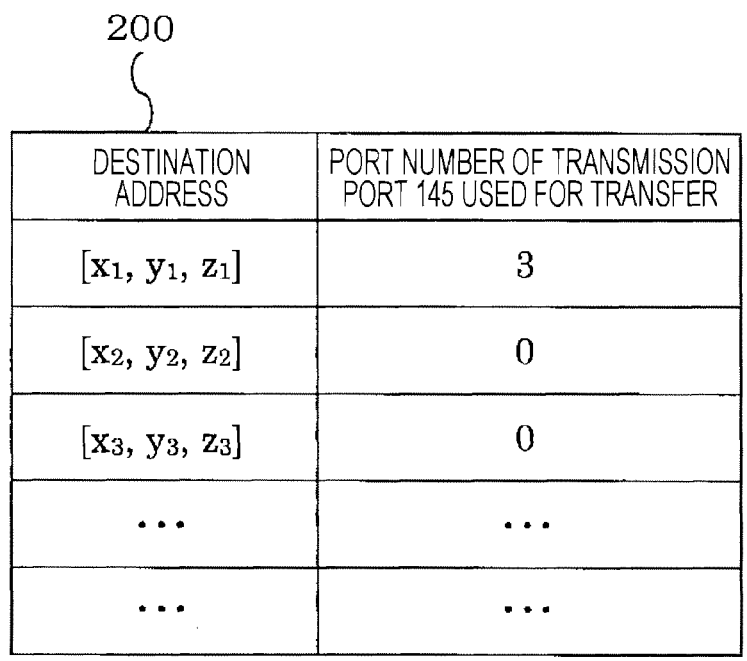
FIG. 5 is a figure illustrating an example of a power management packet transfer history table.

The transfer destination selection unit 124 selects the transmission destination of the data packet 300 by using the power management packet transfer history table 200 as shown in FIG. 5, the routing table 1200 as shown in FIG. 12, and the table 1100 as shown in FIG. 11. As explained later, the power management packet transfer history table 200 is stored in the memory 134 of the power management unit 130, and is a table storing, as entry information, which port of the transmission port 145 of the processing node in question is used when the power management packet 400 is transferred to the processing node indicated by the destination address 402. As shown in the table 1100 explained later, which port of the transmission port 145 of the processing node in question is used corresponds to which processing node of another processing node connected with the processing node in question is used for the transfer. The routing table 1200 is stored in the memory 134 of the power management unit 130, and is a table indicating a subsequent transfer destination address when the data packet 300 or power management packet 400 is transferred to the processing node indicated by the destination addresses 302, 402. The routing table 1200 of FIG. 12 is generated on the basis of a policy for selecting the address of the transfer destination so that the address is caused to be closer to the destination addresses 302, 402 in the order of x if x does not match, in the order of y if y does not match, and in the order of z if the z does not match, but the routing table 1200 can be regenerated by dynamically changing the policy in accordance with the congestion situation of the network due to the transfer of the data packets 300 and the power management packets 400. For example, between the processing nodes where the network is congested in the communication in the x direction, the policy is changed so that the address is caused to be closer to the destination addresses 302, 402 in the order of y, z, x or in the order of z, y, x, and the change is reflected in the routing table 1200. The table 1100 is stored to the memory 134 of the power management unit 130, and is a table indicating relationship between the port numbers of the transmission port 125, the reception port 127, the transmission port 145, and the reception port 147, and the connection destination processing node. In the table 1100 of FIG. 11, the port number of each port is the same.

First, the transfer destination selection unit 124 determines whether the destination address 302 of the data packet 300 transmitted from the data transfer control unit 121 matches the destination address of an entry in the power management packet transfer history table 200. When there is a matching address as a result of the determination, the transfer destination selection unit 124 transfers the data packet 300 via the port corresponding to the port indicated by the entry, which is determined to match the data packet 300, of the ports of the transmission port 125. As explained later, since the communication path including the port corresponding to the destination address of the entry in the power management packet transfer history table 200 has already been woken up, the data packet 300 is transferred without waiting for the transition from the low power state to the normal state. In addition, the port is woken up as necessary, the power consumed by the information processing system 2000 can be reduced.

On the other hand, when there is no matching address, the transfer destination selection unit 124 refers to the routing table 1200 and selects the transfer destination, and obtains information about the port of the transmission port 125 that is required to be woken up in order to perform transfer to the transfer destination selected with reference to the table 1100, and transmits the wake-up request of the necessary port and the destination address 302 to the data communication power control unit 132 of the power management unit 130. Upon transmission of the wake-up request and the destination address 302, the transfer selection unit 124 receives the completion of the wake-up, and executes again the determination as to whether the destination address 302 matches the destination address in the power management packet transfer history table 200.

The data reception unit 123 includes the arbitration unit 126 and the reception port 127 which is the communication port. Each port of the reception port 127 includes a receiver for high speed serial transmission capable of communicating at a frequency in GHz band. Therefore, the power consumed at each port of the reception port 127 is high because the supplied clock is high. The data reception unit 123 receives the data packet 300 transmitted from another processing node at the reception port 127, and the arbitration unit 126 arbitrates the data packet 300 transferred from each port of the reception port 127, and the data reception unit 123 transmits the received data packet 300 to the data transfer control unit 121. Each port of the reception port 127 is connected to the transmission port 125 of another processing node connected with the processing node 100.

The power management unit 130 includes a data communication state observation unit 131, a data communication power control unit 132, a power management packet history control unit 133, and a memory 134. Hereinafter, each unit will be explained.

The data communication state observation unit 131 obtains information about the operation state of the data communication unit 120 by communicating with each unit of the data communication unit 120, and can obtain information indicating whether the entire data communication unit 120, the entire data transmission unit 122, the entire data reception unit 123, each port of the transmission port 125, and each port of the reception port 127 are in the low power state or in the normal state.

The data communication power control unit 132 receives a request from the CPU 111, the data communication unit 120, the power management packet transmission unit 142 explained later, and the power management packet reception unit 143, and changes the operation state indicating whether the entire data communication unit 120, the entire data transmission unit 122, the entire data reception unit 123, each port of the transmission port 125, and each port of the reception port 127 are in the low power state or in the normal state, and gives an update command of the power management packet transfer history table 200 to the power management packet history control unit 133. When each port of the transmission port 125 is changed to the normal state, the data communication power control unit 132 changes the necessary portion of the data transmission unit 122 and the data transfer control unit 121 into the normal state, if the entire data transmission unit 122 and the data transfer control unit 121 are in the low power state. When each port of the reception port 127 is changed to the normal state, the data communication power control unit 132 changes the necessary portion of the data reception unit 123 and the data transfer control unit 121 into the normal state, if the entire data reception unit 123 and the data transfer control unit 121 are in the low power state. When the data communication power control unit 132 receives a request of transmission of data from the CPU 111, request for generation of the power management packet 400 is sent to a power management packet control unit 141.

The power management packet history control unit 133 updates the power management packet transfer history table 200 on the basis of the command of the data communication power control unit 132. As explained later, the power management packet transfer history table 200 is a table that has, as entry information, as to which port of the transmission port 145 of the processing node in question is used, that is, which processing node of other processing nodes connected to the processing node in question the transmission is sent to, when the power management packet 400 is transmitted to the processing node indicated by the destination address 402. In the power management packet transfer history table 200, registration or deletion is made in an entry on the basis of information about the identifier 401 of the power management packet 400, the destination address 402, and the port number of the transmission port 145 used for the transfer. When the identifier 401 is the wake-up request, and there is no address matching the destination address 402 in the power management packet transfer history table 200, the power management packet history control unit 133 registers it as a new entry in the power management packet transfer history table 200, and when there is a matching address, the entry having the matching address is overwritten and updated. When the identifier 401 is the stop request, the entry having the address matching the destination address 402 is deleted.

The memory 134 stores information about the address of the processing node in question, the power management packet transfer history table 200, the table 1100, and the routing table 1200.

The power management communication unit 140 includes the power management packet control unit 141, the power management packet transmission unit 142, and the power management packet reception unit 143. The power management packet control unit 141 generates the power management packet 400 in response to the command given by the data communication power control unit 132, and transfers the generated power management packet 400 to the power management packet transmission unit 142. The power management packet control unit 141 extracts the destination address 402 included in the power management packet 400 received from the power management packet reception unit 143, and compares the extracted address 402 and the address of the processing node in question stored in the memory 134 of the power management unit 130, thus determining the address. When the destination address 402 matches the address of the processing node in question as a result of determination, the power management packet 400 is not transmitted to the power management packet transmission unit 142, and when the destination address 402 does not match the address of the processing node in question, the power management packet 400 is transmitted to the power management packet transmission unit 142.

Figure 6:
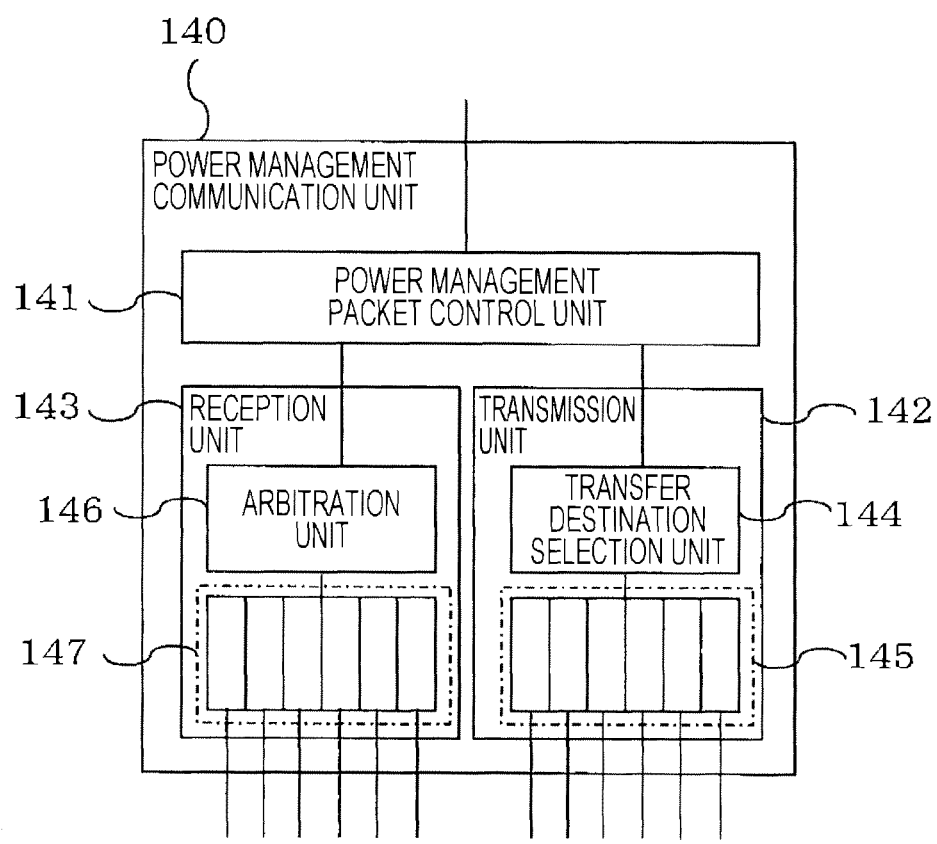
FIG. 6 is a figure illustrating details of an example of a power management communication unit.

FIG. 6 illustrates a block diagram of the power management communication unit 140 showing the details of the power management packet transmission unit 142 and the power management packet reception unit 143. The power management packet transmission unit 142 includes the transfer destination selection unit 144 and the transmission port 145. Each port of the transmission port 145 is connected to the reception port 147 of another processing node connected to the processing node 100. The connection relationship between each port of the transmission port 145 and each port of the reception port 147 is stored to the memory 134 as the table 1100.

The transfer destination selection unit 144 selects to which processing node of the processing nodes connected to the processing node 100 the power management packet 400 is, for the power management packet 400 transmitted from the power management packet control unit 141, is transferred to by referring to the routing table 1200, and transmits the power management packet 400 via the transmission port 145 by referring to the table 1100. The transfer destination selection unit 144 decodes the identifier 401 of the power management packet 400, and when the decoded result is the wake-up request, the wake-up request for waking-up the port of the transmission port 125 corresponding to the port of the transmission port 145 used for the transfer of the power management packet 400 as well as information about the destination address 402 and information about the number of the port of the transmission port 145 used for transfer of the power management packet 400 are transmitted to the data communication power control unit 132 by referring to the table 1100. When the decoded result is the stop request, the transfer destination selection unit 144 refers to the table 1100, and transmits the wake-up request for waking up the port of the transmission port 125 corresponding to the port of the transmission port 145 used for the transfer of the power management packet 400 as well as information about the destination address 402 and information about the number of the port of the transmission port 145 used for transfer of the power management packet 400 to the data communication power control unit 132. At this occasion, the data transmission/reception is treated as a set, and the wake-up request or the stop request for stopping the port of the reception port 127 corresponding to the port of the transmission port 125 to which the wake-up request or the stop request is given is also performed at the same time, but in order to achieve more detailed power control, the wake-up or the stop of the data transmission unit 122 and the data reception unit 123 can be controlled independently.

The power management packet reception unit 143 includes the arbitration unit 146 and the reception port 147. Each port of the reception port 147 is connected to the transmission port 145 of another processing node connected to the processing node 100. The connection relationship of each port of the reception port 147 and each port of the transmission port 145 is stored in the memory 134 as the table 1100. The power management packet reception unit 143 receives the power management packet 400 transmitted from another processing node via the reception port 147, and the arbitration unit 146 arbitrates the power management packet 400 transferred from each port, and decodes the identifier 401, and transmits the power management packet 400 to the power management packet control unit 141. When the decoded result of the identifier 401 is the wake-up request, the power management packet reception unit 143 refers to the table 1100, and transmits the wake-up request for waking up the port of the reception port 127 corresponding to the port of reception port 147 used for reception to the data communication power control unit 132. When the decoded result of the identifier 401 is the stop request, the power management packet reception unit 143 refers to the table 1100, and transmits the stop request for stopping the port of the reception port 127 corresponding to the port of reception port 147 used for reception to the data communication power control unit 132. At this occasion, the data transmission/reception is treated as a set, and the wake-up request or the stop request for waking up/stopping the port of the transmission port 125 corresponding to the port of the reception port 127 to which the wake-up request or the stop request is given is also performed at the same time, but in order to achieve more detailed power control, the wake-up or the stop of the data transmission unit 122 and the data reception unit 123 can be controlled independently.

Figure 9:
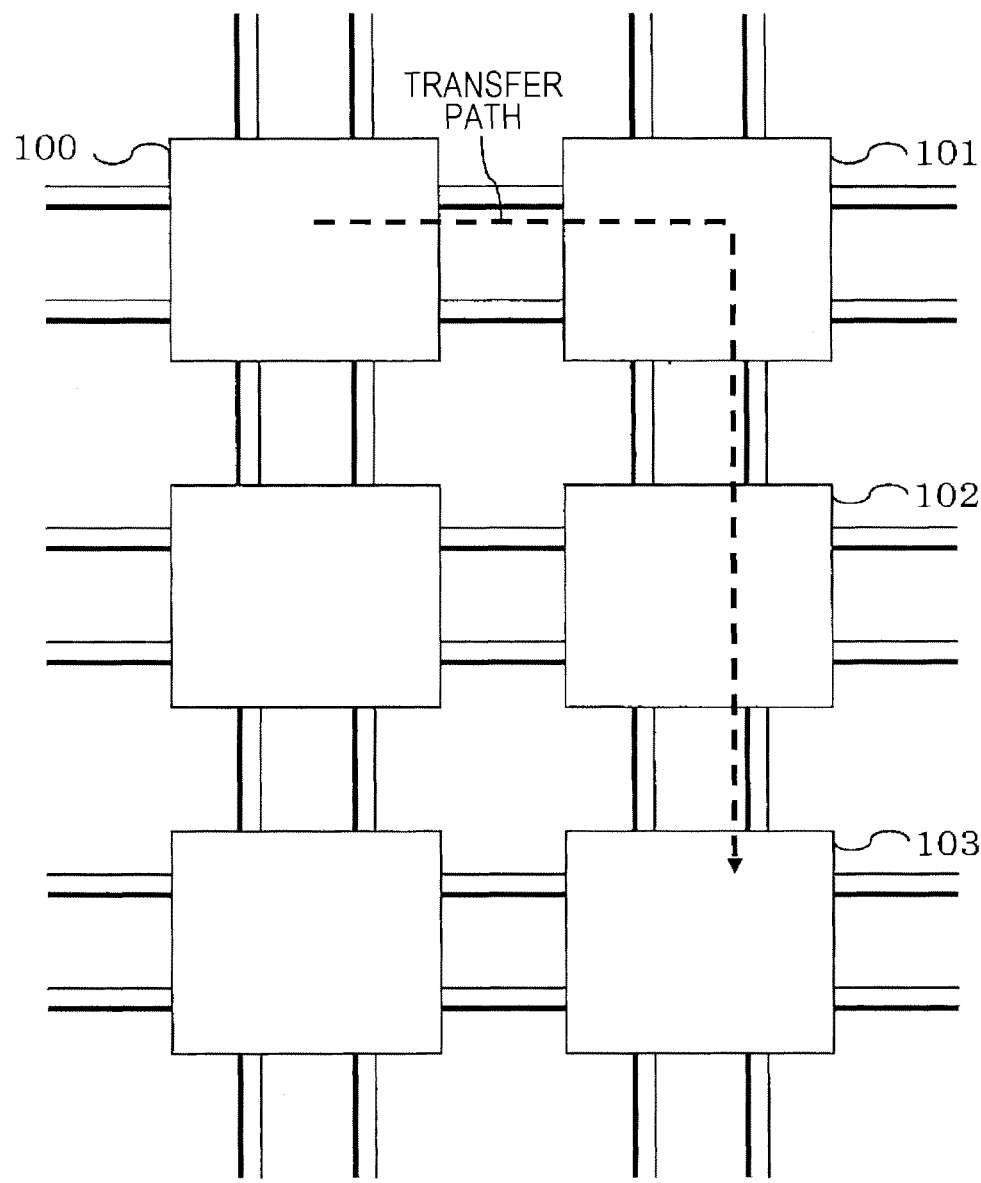
FIG. 9 is a figure illustrating an example of multihop transfer according to the present invention.
Figure 10:
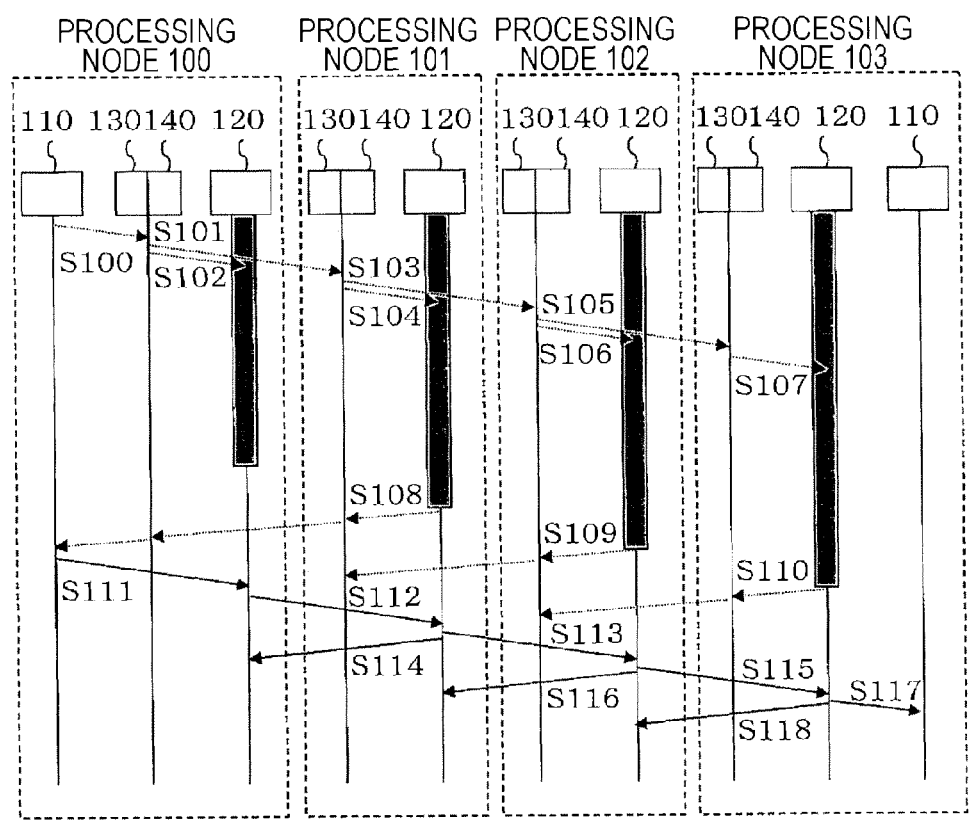
FIG. 10 is a sequence diagram illustrating operation of an example of multihop transfer according to the present invention.

Subsequently, operation of the multihop transfer according to the embodiment will be explained with reference to the sequence diagram as shown in FIG. 10 using an example of transfer shown in FIG. 9 in which data are transferred from the processing node 100 via the processing node 101 and the processing node 102 to the processing node 103. It should be noted that the processing node 100 corresponds to the address [3, 6, 5], the processing node 101 corresponds to the address [4, 6, 5], the processing node 102 corresponds to the address [4, 5, 5], the processing node 103 corresponds to the address [4, 4, 5], respectively. In the initial state, the entire data communication unit 120 of each processing node is considered to be in the low power state.

First, in step 100, when the processing node 100 transfers data to the processing node 103, the CPU 111 of the processing node 100 requests the data communication power control unit 132 to perform data transmission, of which the final destination is the processing node 103. The CPU 111 requests the data communication state observation unit 131 to send information about the state of the data communication unit 120. The data communication state observation unit 131 having received the request checks the state of the data communication unit 120, and notifies the CPU 111 that the entire data communication unit 120 is in the low power state. The CPU 111 having received the notification waits for the wake-up completion notification from the data communication power control unit 132.

Subsequently, in step S101, the data communication power control unit 132 commands the power management packet control unit 141 to generate the power management packet 400 of which identifier 401 is the wake-up request with the processing node 103 being the destination on the basis of the request given by the CPU 111. The power management packet 400 generated by the power management packet control unit 141 is transmitted to the power management packet transmission unit 142, and as a result of selection of the relay destination by the transfer destination selection unit 144, the power management packet 400 is transferred to the processing node 101. The transfer destination selection unit 144 decodes the identifier 401 of the power management packet 400, and the decoded result is the wake-up request, and therefore, the transfer destination selection unit 144 refers to the table 1100, and transmits the wake-up request for waking up the port of the port number 1 of the transmission port 125 corresponding to the port used for transfer in the transmission port 145 to the data communication power control unit 132.

Subsequently, in step S102, on the basis of the wake-up request given by the transfer destination selection unit 144, the data communication power control unit 132 of the processing node 100 starts wake-up of the data transfer control unit 121, the transfer destination selection unit 124, the port of the port number 1 of the transmission port 125, the arbitration unit 126, and the port of the port number 1 of the reception port 127 corresponding to the wake-up target port of the transmission port 125. The destination address indicated by the processing node 103 and the port number "1" of the port of the transmission port 145 connected to the processing node 101 are registered in the entry of the power management packet transfer history table 200.

Subsequently, in step S103, the processing node 101 receives the power management packet 400 transmitted from the processing node 100, and the power management packet control unit 141 determines whether the destination address 402 matches the address of the processing node in question. Because the determination result is "not matching", the power management packet 400 is transmitted to the power management packet transmission unit 142. The transfer destination selection unit 144 selects the processing node 102 as the transfer destination, and the power management packet 400 is transferred to the processing node 102.

Subsequently, in step S104, the result indicating selection of the processing node 102 in 5103 is notified to the data communication power control unit 132, so that the processing node 101 starts wake-up of the data transfer control unit 121, the transfer destination selection unit 124, the transmission port 125 corresponding to the transmission port 145 used for transmission of the power management packet 400, the arbitration unit 126, and the reception port 127 corresponding to the wake-up target port of the transmission port 125. The destination address indicating the processing node 103 and the port number of the port of the transmission port 145 connected to the processing node 102 are registered to the entry of the power management packet transfer history table 200. In parallel with the matching determination of the destination address 402 in S103, the arbitration unit 146 decodes the identifier 401 of the power management packet 400, and confirms that it is the wake-up request. When the notification indicating that the identifier 401 is the wake-up request is notified to the data communication power control unit 132, the reception port 127 corresponding to the reception port 147 used for reception of the power management packet 400 and the transmission port 125 corresponding to the port of the wake-up target of the reception port 127 are started to be woken up.

Subsequently, in step S105, the processing node 102 receives the power management packet 400 transmitted from the processing node 101, and the power management packet control unit 141 determines whether the destination address 402 matches the address of the processing node in question. Because the determination result indicates that it is addressed to another processing node, the power management packet 400 is transmitted to the power management packet transmission unit 142. The transfer destination selection unit 144 selects the processing node 103 as the transfer destination, and the power management packet 400 is transferred to the processing node 103.

Subsequently, in step S106, the result in S105 is notified to the data communication power control unit 132, the processing node 102 starts wake-up of the data transfer control unit 121, the transfer destination selection unit 124, the transmission port 125 corresponding to the transmission port 145 used for transmission of the power management packet 400, the arbitration unit 126, and the reception port 127 corresponding to the wake-up target port of the transmission port 125. The destination address indicating the processing node 103 and the port number of the port of the transmission port 145 connected to the processing node 103 are registered to the entry of the power management packet transfer history table 200. In parallel with the matching determination of the destination address 402 in S105, the arbitration unit 146 decodes the identifier 401 of the power management packet 400, and confirms that it is the wake-up request. When the notification indicating that the identifier 401 is the wake-up request is notified to the data communication power control unit 132, the reception port 127 corresponding to the reception port 147 used for reception of the power management packet 400 and the transmission port 125 corresponding to the port of the wake-up target of the reception port 127 are started to be woken up.

Subsequently, in step S107, the processing node 103 receives the power management packet 400 transmitted from the processing node 102, and the power management packet control unit 141 determines whether the destination address 402 matches the address of the processing node in question. Because the determination result is "matching", that is, it indicates that the power management packet 400 is addressed to the processing node in question, the power management packet 400 is not transferred to another processing node. The arbitration unit 146 decodes the identifier 401 of the power management packet 400, and confirms that it is the wakeup request. When the notification indicating that the identifier 401 is the wake-up request is sent to the data communication power control unit 132, the reception port 127 corresponding to the reception port 147 used for reception of the power management packet 400 and the transmission port 125 corresponding to the port of the wake-up target of the reception port 127 are started to be woken up.

In steps S108, S109, S110, each processing node sends, to the processing node of the transmission source of the power management packet 400, a notification indicating that the transmission/reception unit of the data communication unit 120 has been woken up and the processing node is ready for data communication.

In step S111, the CPU 111 of the processing node 100 receives the wake-up completion notification from the data transfer control unit 121, and requests the data transfer control unit 121 to perform the data transfer with the processing node 103 being the destination. When already woken up in step S100, the request is given in step S100.

Subsequently, in step S112, the data transfer control unit 121 generates the data packet 300, the generated data packet 300 is transmitted to the transfer destination selection unit 124. As a result of the matching determination between the destination address 302 and the entry in the power management packet transfer history table 200, the entry registered in step S102 matches the destination address 302, and therefore, the transfer destination selection unit 124 selects the processing node 101 as the transfer destination, and transmits the data packet 300 to the processing node 101.

Subsequently, in step S113, the processing node 101 receives the data packet 300 transmitted from the processing node 100, and the data transfer control unit 121 determines whether the destination address 302 matches the address of the processing node in question. Because the determination result is "not matching", that is, the data packet 300 is a packet addressed to another processing node, the data packet 300 is transmitted to the data transmission unit 122. As a result of the matching determination between the destination address 302 and the power management packet transfer history table 200, the entry registered in step S104 matches the destination address 302, and therefore, the transfer destination selection unit 124 selects the processing node 102 as the transfer destination, and the data packet 300 is transferred to the processing node 102.

When the data packet 300 has been received in step S113, the transfer reception is notified to the processing node 100 in step S114.

In step S115, the processing node 102 receives the data packet 300 transmitted from the processing node 101, the data transfer control unit 121 determines whether the destination address 302 matches the address of the processing node in question. Because the determination result is "not matching", that is, the data packet 300 is a packet addressed to another processing node, the data packet 300 is transmitted to the data transmission unit 122. As a result of the matching determination between the destination address 302 and the power management packet transfer history table 200, the entry registered in step S106 matches the destination address 302, and therefore, the transfer destination selection unit 124 selects the processing node 103 as the transfer destination, and the data packet 300 is transferred to the processing node 103.

When the data packet 300 has been received in step S115, the transfer reception is notified to the processing node 101 in step S116.

Subsequently, in step S117, the processing node 103 receives the data packet 300 transmitted from the processing node 102, and the data transfer control unit 121 determines whether the destination address 302 matches the address of the processing node in question. Because the determination result is "matching", that is, it indicates that the data packet 300 is a packet addressed to the processing node in question, the identifier 301 is decoded, the payload 303 is transferred to the memory 112.

When the data packet 300 has been received in step S117, the transfer reception is notified to the processing node 102 in step S118.

As described above, in the information processing system 2000 according to the present embodiment, each processing node is configured to be able to control wake-up and stop of the data communication unit 120 in accordance with transmission/reception of the power management packet 400, and therefore, all or a part of the data communication unit 120, except the portion woken up for transmission/reception of the data packet 300, can be caused to change into the low power state. Therefore, each processing node can save power consumption. In addition, in the information processing system 2000 according to the present embodiment, the processing nodes up to the destination processing node performs transmission/reception of the power management packet 400 without waiting for wake-up of the data communication unit 120, and in parallel, the data communication unit 120 of each processing node can be woken up, and further, a portion of the data communication unit 120 of each processing node is woken up in advance on the basis of the transmission/reception of the power management packet 400, and by using the woken up portion, the data packet 300 is transmitted and received, and therefore, this can reduce the waiting time for waiting for the data transfer due to the transition from the low power state to the normal state. Therefore, this can reduce the reduction of the data transfer performance caused by the usage of the low power state.

REFERENCE SIGNS LIST 100 to 103 processing node
110 data processing unit
111 CPU
112 memory
120 data communication unit
121 data transfer control unit
122 data transmission unit
123 data reception unit
124 transfer destination selection unit (of data transmission unit)
125 transmission port (of data transmission unit)
126 arbitration unit (of data transmission unit)
127 reception port (of data transmission unit)
130 power management unit
131 data communication state observation unit
132 data communication power control unit
133 power management packet history control unit
134 memory
140 power management communication unit
141 power management packet control unit
142 power management packet transmission unit
143 power management packet reception unit
144 transfer destination selection unit (of power management packet transmission unit)
145 transmission port (of power management packet transmission unit)
146 arbitration unit (of power management packet transmission unit)
147 reception port (of power management packet transmission unit)
200 power management packet transfer history table
300 data packet
301 identifier (of data packet)
302 destination address (of data packet)
303 payload (of data packet)
400 power management packet
401 identifier (of power management packet)
402 destination address (of power management packet)
1200 routing table
2000 information processing system
FIG. 1
100 PROCESSING NODE
110 DATA PROCESSING UNIT
120 DATA COMMUNICATION UNIT
130 POWER MANAGEMENT UNIT
140 POWER MANAGEMENT COMMUNICATION UNIT CONNECTION WITH ANOTHER PROCESSING NODE)
101 PROCESSING NODE
FIG. 3
100 PROCESSING NODE
110 DATA PROCESSING UNIT
112 MEMORY
130 POWER MANAGEMENT UNIT
131 OBSERVATION UNIT
132 POWER CONTROL UNIT
133 HISTORY CONTROL UNIT
134 MEMORY
120 DATA COMMUNICATION UNIT
121 DATA TRANSFER CONTROL UNIT
122 TRANSMISSION UNIT
123 RECEPTION UNIT
140 POWER MANAGEMENT COMMUNICATION UNIT
141 POWER MANAGEMENT PACKET CONTROL UNIT
142 TRANSMISSION UNIT
143 RECEPTION UNIT CONNECTION WITH ANOTHER PROCESSING NODE)
FIG. 4
120 DATA COMMUNICATION UNIT
121 DATA TRANSFER CONTROL UNIT
122 TRANSMISSION UNIT
123 RECEPTION UNIT
124 TRANSFER DESTINATION SELECTION UNIT
126 ARBITRATION UNIT
FIG. 5
200 DESTINATION ADDRESS PORT NUMBER OF TRANSMISSION PORT 145 USED FOR TRANSFER)
FIG. 6
140 POWER MANAGEMENT COMMUNICATION UNIT
141 POWER MANAGEMENT PACKET CONTROL UNIT
142 TRANSMISSION UNIT
143 RECEPTION UNIT
144 TRANSFER DESTINATION SELECTION UNIT
146 ARBITRATION UNIT
FIG. 7
301 IDENTIFIER
302 DESTINATION ADDRESS
303 PAYLOAD
FIG. 8
401 IDENTIFIER
402 DESTINATION ADDRESS
FIG. 9
TRANSFER PATH
FIG. 10
100 PROCESSING NODE
101 PROCESSING NODE
102 PROCESSING NODE
103 PROCESSING NODE
LOW POWER STATE)
FIG. 11
PORT NUMBER OF TRANSMISSION PORT 145
PORT NUMBER OF RECEPTION PORT 127
CONNECTION DESTINATION PROCESSING NODE
FIG. 12
NEXT TRANSFER DESTINATION
FINAL DESTINATION

The invention claimed is:

1. An information processing system including a plurality of information processing apparatuses connected by a multihop network,
each of the information processing apparatuses comprising:
a first communication unit configured to transmit and receive a first packet including information about a destination address: and
a second communication unit configured to communicate at a frequency higher than that of the first communication unit, and transmit and receive a second packet including a payload to the destination address,
wherein in each of the information processing apparatuses, when the first communication unit receives the first packet and the first packet is addressed to the information processing apparatus, the second communication unit is woken up.

2. The information processing system according to claim 1, wherein each of the information processing apparatuses includes a memory, the memory stores information about a transfer destination of the first packet, and the second packet is transferred on the basis of information about the transfer destination.

3. The information processing system according to claim 2, wherein the memory of each information processing apparatus further stores a routing table and information about an address of each of the information processing apparatuses, and each of the information processing apparatuses determines whether the destination address matches the address of each of the information processing apparatuses, and when a determination result indicates nonmatching, the first packet is transferred on the basis of the routing table.

4. The information processing system according to claim 2, wherein the second communication unit has a communication port for each information processing apparatus of connection destination among the plurality of information processing apparatuses, and wakes up, hibernates, or stops each communication port in accordance with the information about the transfer destination.

5. The information processing system according to claim 4, each communication port of the second communication unit is hibernated or stopped after a predetermined period of time passes since wake-up where the first communication unit receives the first packet.

6. The information processing system according to claim 1 comprising:

a first channel configured to transmit the first packet; and a second channel configured to transmit the second packet.

7. The information processing system according to claim 1, wherein the multihop network is a three-dimensional torus network.

8. The information processing system according to claim 1, wherein the second communication unit communicates using high speed serial transmission.

9. The information processing system according to claim 1, wherein the first communication unit communicates in MHz band, and the second communication unit communicates in GHz band.

* * * * *